United States Patent
Stamatoukos et al.

(10) Patent No.: US 9,597,867 B2
(45) Date of Patent: Mar. 21, 2017

(54) DIGITAL PRINTED DUCT TAPE

(71) Applicant: SHURTAPE TECHNOLOGIES, LLC, Hickory, NC (US)

(72) Inventors: George Stamatoukos, Hudson, NC (US); Daniel Eric Festa, Sr., Strongsville, OH (US); Stanley Williams, Hickory, NC (US); Donald Terry Hagood, Hickory, NC (US)

(73) Assignee: Shurtape Technologies, LLC, Hickory, NC (US)

( * ) Notice: Subject to any disclaimer, the term of this patent is extended or adjusted under 35 U.S.C. 154(b) by 40 days.

(21) Appl. No.: 14/338,513

(22) Filed: Jul. 23, 2014

(65) Prior Publication Data

US 2015/0030823 A1    Jan. 29, 2015

Related U.S. Application Data

(60) Provisional application No. 61/858,481, filed on Jul. 25, 2013.

(51) Int. Cl.
*B32B 3/00* (2006.01)
*B41J 2/01* (2006.01)
*B41M 5/00* (2006.01)
*B41M 7/00* (2006.01)

(52) U.S. Cl.
CPC .............. *B41J 2/01* (2013.01); *B41M 5/0047* (2013.01); *B41M 5/0064* (2013.01); *B41M 7/0081* (2013.01); *B41M 2205/12* (2013.01); *B41M 2205/40* (2013.01); *Y10T 428/24802* (2015.01); *Y10T 428/24868* (2015.01)

(58) Field of Classification Search
CPC ...... B41J 2/01; B41M 5/0047; B41M 5/0064; B41M 7/0081; B41M 2205/12; B41M 2205/40; Y10T 428/24802; Y10T 428/24868
See application file for complete search history.

(56) References Cited

U.S. PATENT DOCUMENTS

| 6,348,262 B1 * | 2/2002 | Huffman ................. B44C 1/105 427/208.4 |
| 2006/0159914 A1 | 7/2006 | Beard et al. |
| 2009/0286049 A1 | 11/2009 | McFarland et al. |
| 2011/0058000 A1 | 3/2011 | Rodin et al. |

(Continued)

OTHER PUBLICATIONS

International Search Report and Written Opinion for PCT International Patent Application No. PCT/US2014/047788, dated Oct. 24, 2014.

(Continued)

*Primary Examiner* — Elizabeth Mulvaney
(74) *Attorney, Agent, or Firm* — Nelson Mullins Riley & Scarborough LLP

(57) ABSTRACT

A duct tape and a method of making a duct tape having a customized, printed design on a surface of the duct tape. The method comprises providing a design for printing on the duct tape, digitally printing the design on the surface of the duct tape, and curing the ink printed on the duct tape with ultraviolet light in dual stages. The method further comprises applying on the digitally printed duct tape a material or composition having overcoat properties, release properties, or a combination thereof.

22 Claims, 5 Drawing Sheets

(56) References Cited

U.S. PATENT DOCUMENTS

| | | | |
|---|---|---|---|
| 2012/0111812 A1* | 5/2012 | Bahr | A47F 7/00 211/59.2 |
| 2012/0301660 A1 | 11/2012 | Bartusiak | |
| 2013/0050368 A1 | 2/2013 | Lahut et al. | |
| 2013/0059105 A1 | 3/2013 | Wright et al. | |
| 2013/0101809 A1* | 4/2013 | Kohlweyer | B41M 7/00 428/195.1 |
| 2013/0189503 A1* | 7/2013 | Kozee | C09D 11/328 428/195.1 |
| 2013/0236703 A1* | 9/2013 | Sommers | C09J 7/02 428/195.1 |
| 2014/0329426 A1* | 11/2014 | Peloquin | C09J 11/04 442/1 |

OTHER PUBLICATIONS

Chapter I International Preliminary Report on Patentability of corresponding application PCT/US2014/047788, mailed Feb. 4, 2016.

* cited by examiner

DIGITAL PRINTED DUCT TAPE

CROSS-REFERENCE TO RELATED APPLICATIONS

This application claims priority from provisional U.S. Patent Application Ser. No. 61/858,481, filed Jul. 25, 2013, the disclosure of which is incorporated by reference in its entirety.

FIELD OF THE INVENTION

The present invention relates to a method of making a duct tape having a digitally printed design, particularly to a method of making a duct tape having a customized, digitally printed design.

BACKGROUND OF THE INVENTION

There are numerous adhesive tapes in the marketplace. One such tape is duct tape which is known for its high level of adhesive strength. Duct tape typically is relatively thin having a thickness in a range of 5 mils to 12 mils. Duct tape can be torn by hand; however, when unrolled it has a tendency to adhere to itself.

Presently, duct tapes are printed two ways. The first method is reverse printing which allows the duct tape to be self-wound such that no release liner is required. Another option is to use surface printing; however, the print quality is generally very poor and the ink adhesion to the tape is also very poor. Both of these methods also require an investment in print plates and typically require substantial minimum order quantities. The idea behind custom digital printing is to create a tape product that requires no or small minimum order quantities, has very short lead times (on demand printing) and has performance comparable to printed duct tapes that are in the market today. Also, there is no investment in print plates required.

SUMMARY OF THE INVENTION

The present invention relates to a digitally printed duct tape and to methods of making the digitally printed duct tape. The methods of the present invention are particularly suited to printing customized designs and to printing designs in small batches.

Methods of making digitally printed duct tape are discussed herein in accordance with various aspects of the present invention. The methods of the present invention produce a printed duct tape having a UV cured, ink system with the improved efficiencies and cost effectiveness of digital printing. The digital printed duct tape of the present invention may be made with or with or without a release liner. The digital printed duct tape may comprise a material or composition having overcoat properties, release properties, or a combination thereof.

The method(s) of the present invention may be used to make custom digital printed duct tape in the form of die-cuts, rolls, sheets, and banners. The fact that duct tapes and other tapes, such as packaging and paper, have become expressive tools for many crafters solidifies the need for further customization for the end user. It would be impossible to have every desirable design of duct tape. Beyond this, many users desire to personalize their tape experience. They may want a personal photograph or picture on their duct tape or other tape. For example, a company may seek to have its logo or company name on the tape. Other opportunities include special occasions or events such as weddings, birthdays, reunions, anniversaries or graduations.

An advantage of the method(s) of the present invention is the ability to feed or electronically send to a printer a design via an image file with no print plates required, such that the present method(s) is both inexpensive and fast.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

There are numerous methods of making the digital printed duct tape in accordance with the present invention. Thus, the drawings set forth herein are non-limiting examples of various methods of making customized digitally printed duct tape in accordance with the present invention.

Figure 1:
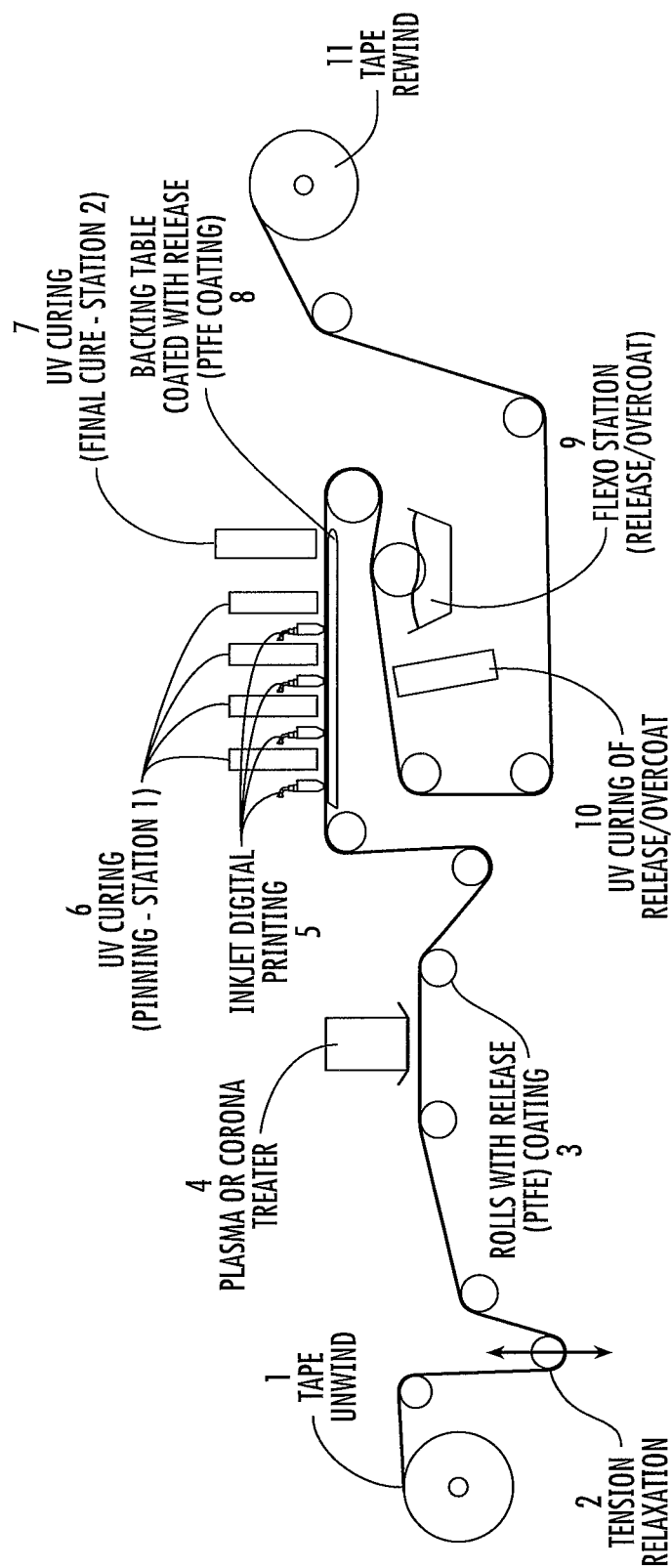
FIG. 1 is a drawing illustrating a method of making the digital printed duct tape of the present invention.

A method of making the digital printed duct tape is shown in FIG. 1. As shown in FIG. 1, a duct tape having an adhesive surface and a non-adhesive surface is provided, and the duct tape is unwound at point 1. Releasing the duct tape from a roll is somewhat tight and may require special web handling to facilitate unwinding. The duct tape travels over a roller(s) with the adhesive surface of the duct tape in contact with the roller(s) until the duct tape reaches point 2. Preferably, the roller(s) in contact with the adhesive surface of the tape are release coated. The duct tape undergoes tension and relaxation at point 2. At point 2, the roller over which the duct tape passes is in contact with the non-adhesive surface of the duct tape. After undergoing tension and relaxation, the adhesive surface of the duct tape passes over other rollers having a release coating, such as polytetrafluoroethylene (PTFE), shown at point 3.

The non-adhesive surface of the duct tape is treated at point 4 in preparation for printing, for example, by passing through a plasma or corona treater. Treatment of the non-adhesive surface of the duct tape may be for a purpose including, but not limited to, preparing the surface for ink adherence and deadening the release so the release coating is not active. The release coating is a low adhesion coating designed to allow the adhesive surface of tape to peel from the surface to which the coating is applied, usually the backside of the tape backing. Deadening the release typically reduces or eliminates the release properties of the low adhesion coating either by removal, oxidation or other chemical or physical change. Plasma or corona treatment nullifies or partially eliminates the functionality (i.e. the release properties) of the release coating and improves surface energy.

A design, which may include a customized design or photograph, is fed or electronically sent via an image file (with no print plates required) to a digital printing station comprising an inkjet printer.

After point 4, the duct tape proceeds to the inkjet digital printing station at point 5. The print design is delivered to the inkjet digital printing station. During inkjet digital printing, printing occurs on the non-adhesive surface of the duct tape. A backing table 8 is coated with a release coating such as PTFE, and the backing table 8 is in contact with the adhesive surface of the duct tape.

After printing, the printed duct tape proceeds to ultraviolet (UV) curing, preferably dual stage UV curing. A first stage of the dual stage UV curing occurs at Station 1, shown at point 6, and a second stage of UV curing occurs at Station 2, shown at point 7. Station 1 is used to pin the ink and allows for higher machine output of up to 250 ft/min Station 2 is a final UV cure to fully cure the ink.

After UV curing of the printed ink, the duct tape proceeds to a flexography station at point 9 where a material or composition having release and/or overcoat properties is applied to the printed surface of the duct tape. This application may occur in a single operation. It is also contemplated that this application could occur in a multi-stage operation with application of a first material or composition having release properties and with application of a second material or composition having overcoat properties, or vice versa. Among the purposes of an overcoat is to protect the ink. The overcoat prevents, for example, the ink printed design from being scratched off. The overcoat also allows the tape to be self-wound (i.e. wound onto itself) without a release liner. In a preferred aspect of the present invention, the ink is a child-safe (European standard) ink. However, in the case of an overcoat, any ink can be used that is compatible with the overcoat material or composition. The material or composition having overcoat properties is a flexographically applied UV chemistry. Flexographic application uses photopolymer plate(s) to transfer the material or composition to the film. The material or composition having overcoat properties may be a varnish or any material or composition that is compatible with the ink. In an aspect of the present invention, the material or a composition having overcoat properties is UV curable. In another aspect of the invention, the material or composition having overcoat properties comprises an acrylic, urethane-acrylic, silicone-acrylic or other acrylic based chemistry. Use of a material or composition having release properties allows an end user to easily remove the duct tape from the roll.

The printed duct tape proceeds to point 10 where the applied material or composition having release and/or overcoat properties is dried. Drying preferably occurs by curing and the type of drying equipment used is preferably ultraviolet. From point 10, the duct tape proceeds to tape rewind at point 11. The method may further comprise winding the digitally printed duct tape for slitting.

FIG. 1 illustrates unwind and web handling of the duct tape, for example, with the use of coatings to avoid adhesive build-up. It also illustrates a method of making the printed duct tape without use of a release liner.

With the method of the present invention, the line rate of digitally print duct tape is improved and speeds as high as 250 ft/min, for example, may be attained. The equipment for use in the method(s) of the present invention may be capable of slitting inline. The equipment that is used may also be capable of sheeting and die-cutting. An example of suitable equipment is a UV curable custom digital printer that has the ability to deaden the release characteristic of the duct tape (via plasma, corona, chemical/primer or other treatment) and which allows the digital printed duct tape to be digitally printed at speeds as high as 150 to 250 ft/min. These rates are not typical for all digital printing; however, equipment employing dual UV curing technology allows for higher throughputs. Digital printing technology does not require costly print plates which allows for the flexibility to execute very short runs. For example, 20 rolls of a custom design may be used to customize duct tape for use at a special occasion (i.e. party favors). In addition to adding costs, print plates also extend the lead time and, as a result, could lead to logistical problems.

Figure 2:
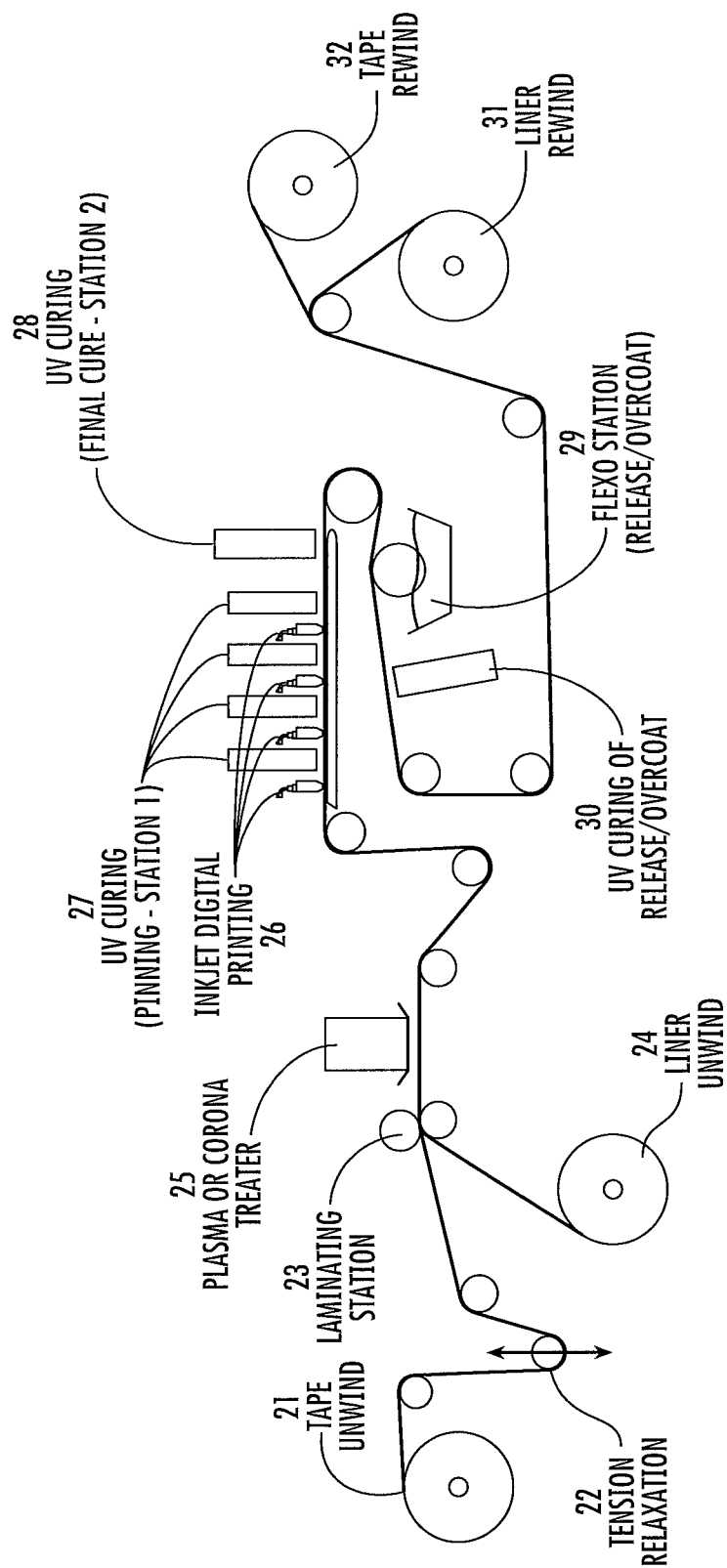
FIG. 2 is a drawing illustrating another method of making the digital printed duct tape of the present invention.

Another method of making the digital printed duct tape in accordance with the present invention is shown in FIG. 2. As shown in FIG. 2, a barrier layer such as a liner is laminated onto the duct tape to ease the web handling through the printing process and the liner is stripped before rewinding the tape. As shown in FIG. 2, a duct tape having an adhesive surface and a non-adhesive surface is provided, and the duct tape is unwound at point 21. Releasing the duct tape from a roll is somewhat tight and may require special web handling to facilitate unwinding. The duct tape travels over a roller(s) with the adhesive surface of the duct tape in contact with the roller(s) until the duct tape reaches point 22. Preferably, the roller(s) in contact with the adhesive surface of the tape are release coated. The duct tape undergoes tension and relaxation at point 22. At point 22, the roller over which the duct tape passes is in contact with the non-adhesive surface of the duct tape. After undergoing tension and relaxation, the adhesive surface of the duct tape passes over other rollers having a release coating, such as polytetrafluoroethylene (PTFE). The duct tape then proceeds to a laminating station at point 23 where a liner is laminated onto the duct tape. The liner unwind occurs at point 24. The non-adhesive surface of the duct tape is treated at point 25 in preparation for printing, for example, by passing through a plasma or corona treater. From point 25, the duct tape proceeds to an inkjet digital printing station at point 26 and then onto ultraviolet (UV) curing. A first stage of the dual stage UV curing occurs at Station 1, shown at point 27, and a second stage of UV curing occurs at Station 2, shown at point 28. Station 1 is used to pin the ink and allows for higher machine output of up to 250 ft/min Station 2 is a final UV cure to fully cure the ink.

After UV curing of the printed ink, the duct tape proceeds to a flexography station at point 29 where a material or composition having release and/or overcoat properties is applied to the printed surface of the duct tape. This application may occur in a single operation. It is also contemplated that this application could occur in a multi-stage operation with application of a first material or composition having release properties and with application of a second material or composition having overcoat properties, or vice versa. The printed duct tape proceeds to point 30 where the applied material or composition having release and/or overcoat properties is dried. Drying preferably occurs by curing and the type of drying equipment used is preferably ultraviolet. From point 30, the printed duct tape proceeds to liner rewind at point 31 where the liner is removed and to tape rewind at point 32 where, for example, the printed duct tape is wound onto a roll.

Figure 3:
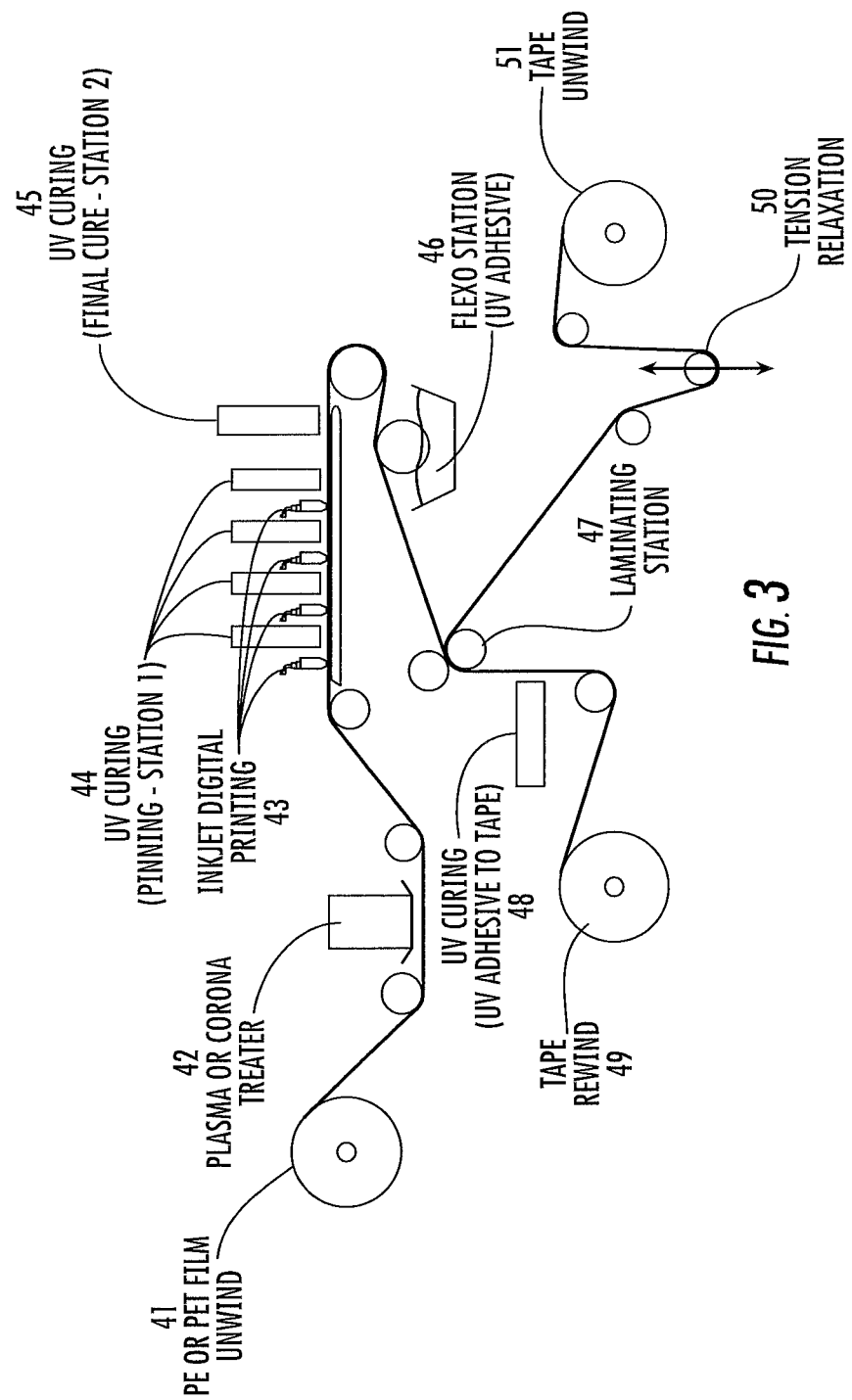
FIG. 3 is a drawing illustrating another method of making the digital printed duct tape of the present invention.

Another method of making digital printed duct tape in accordance with the present invention is shown in FIG. 3. As shown in FIG. 3, printing occurs on a film, preferably a thin film, and then a UV adhesive is applied to a surface of the printed film prior to lamination with a duct tape or subtape component. For example, this method could be used if there are bonding issues using the overcoat material in the other methods. As shown in FIG. 3, a polymeric film such as polyethylene or polyethylene terephthalate goes through unwind at point 41 before undergoing surface treatment by passing through a plasma or corona treater at point 42. After treatment, the film proceeds to an inkjet digital printing station at point 43 and then onto ultraviolet (UV) curing. A first step of UV curing (pinning of the ink at Station 1) occurs at point 44, and a second step of UV curing to dry the ink (final curing at Station 2) occurs at point 45. After UV curing, the printed film proceeds to a flexography station at point 46 where a UV adhesive is applied. A duct tape or a subtape component is unwound from a roll at point 51. The duct tape undergoes tension and relaxation at point 50. The duct tape then proceeds to a laminating station where lamination with the printed film occurs at point 47 to form a laminated tape. UV curing of the UV adhesive of the laminated tape occurs at point 48. Rewind of the laminated tape occurs at point 49.

Figure 4:
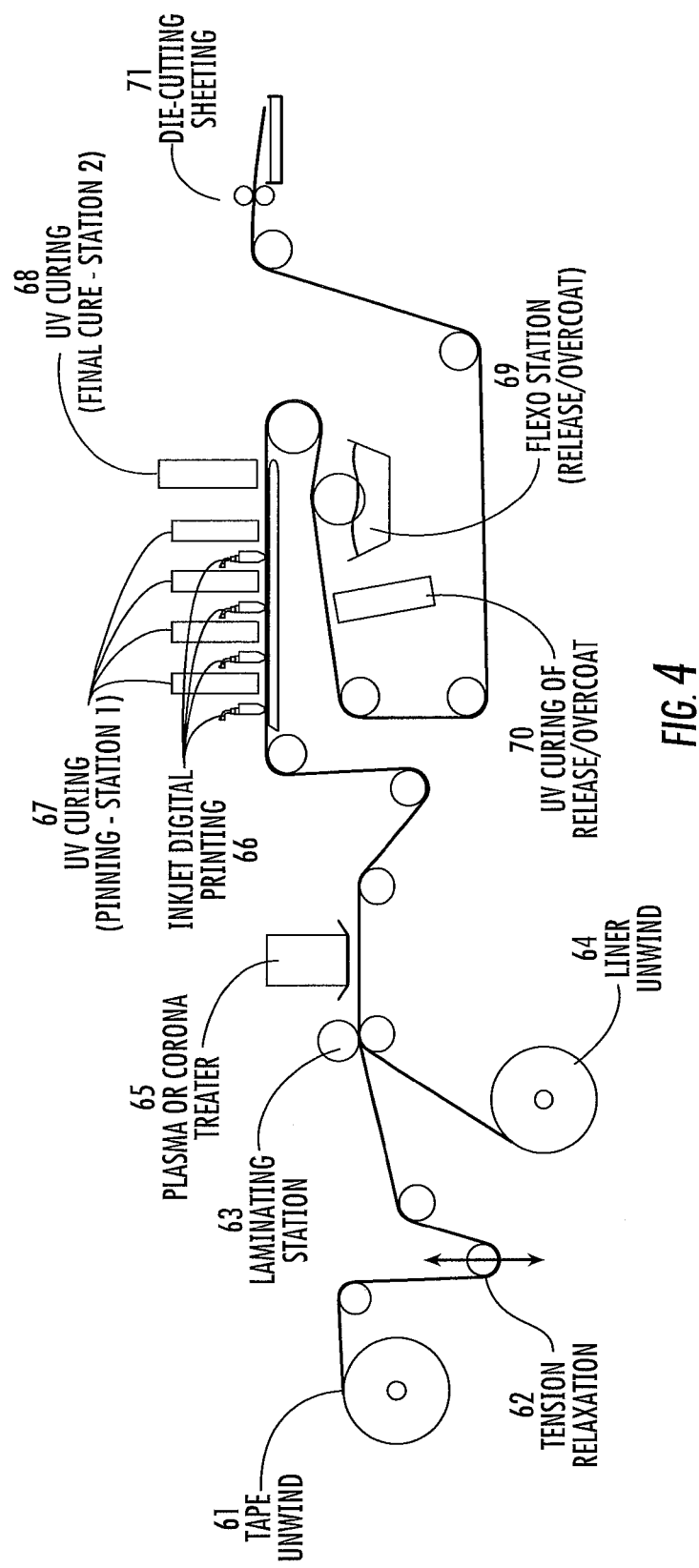
FIG. 4 is a drawing illustrating yet another method of making the digital printed duct tape of the present invention.

Another method of making digital printed duct tape in accordance with the present invention is shown in FIG. 4. The method of FIG. 4 is the same as the method illustrated in FIG. 2 except instead of stripping the liner off, the liner is left on and sheets of the printed tape are cut. Rolls can also be produced on a liner which may be desirable to some end users. As shown in FIG. 4, a duct tape goes through tape unwind at point 61 before undergoing tension and relaxation at point 62. The duct tape then proceeds to a station at point 63 where a liner is laminated or applied to the duct tape. The liner unwind occurs at point 64. The duct tape then passes through a plasma or corona treater at point 65. From point 65, the duct tape proceeds to an inkjet digital printing station at point 66 and then onto ultraviolet (UV) curing. A first step of UV curing (pinning of the ink at Station 1) occurs at point 67, and a second step of UV curing (final curing at Station 2) occurs at point 68. After UV curing, the duct tape proceeds to a flexography station at point 69 where a material or composition having release and/or overcoat properties is applied. The duct tape then proceeds to point 70 where the material or composition having release and/or overcoat properties is cured. From point 70, the duct tape proceeds to die-cutting or sheeting at point 71. The finished product has a release liner.

Figure 5:
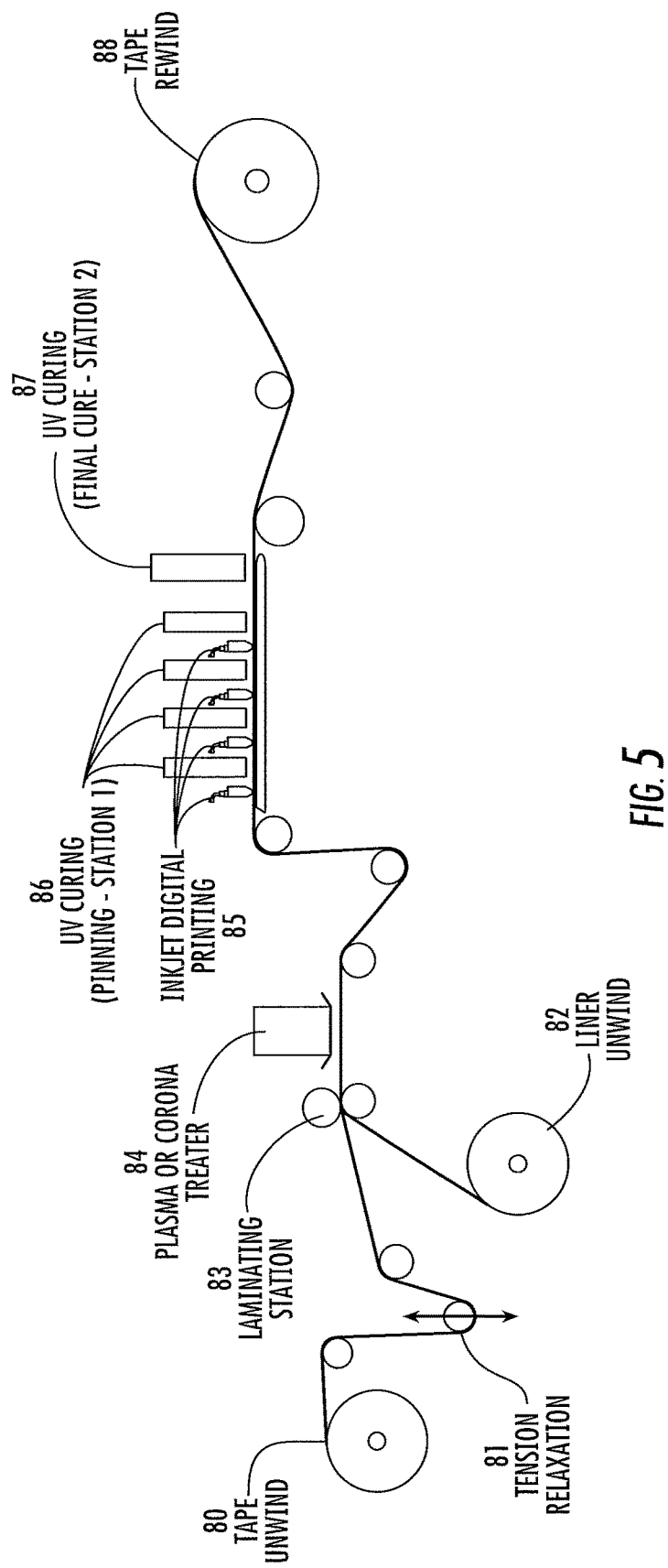
FIG. 5 is a drawing illustrating still yet another method of making the digital printed duct tape of the present invention.

Another method of making the digital printed duct tape in accordance with the present invention is shown in FIG. 5. As shown in FIG. 5, a barrier layer such as a release liner is laminated or applied to the duct tape to ease the web handling through the printing process and so that the liner is present when the printed duct tape is rewound. As shown in FIG. 5, a duct tape having an adhesive surface and a non-adhesive surface is provided, and the duct tape is unwound at point 80. Releasing the duct tape from a roll is somewhat tight and may require special web handling to facilitate unwinding. The duct tape travels over a roller(s) with the adhesive surface of the duct tape in contact with the roller(s) until the duct tape reaches point 81. Preferably, the roller(s) in contact with the adhesive surface of the tape are release coated. The duct tape undergoes tension and relaxation at point 81. At point 81, the roller over which the duct tape passes is in contact with the non-adhesive surface of the duct tape. After undergoing tension and relaxation, the adhesive surface of the duct tape passes over other rollers having a release coating, such as polytetrafluoroethylene (PTFE). The duct tape then proceeds to a station at point 83 where a liner is laminated or applied to the duct tape. The liner unwind occurs at point 82. The non-adhesive surface of the duct tape is treated at point 84 in preparation for printing, for example, by passing through a plasma or corona treater. From point 84, the duct tape proceeds to an inkjet digital printing station at point 85 and then onto ultraviolet (UV) curing. A first stage of the dual stage UV curing occurs at Station 1, shown at point 86, and a second stage of UV curing occurs at Station 2, shown at point 87. Station 1 is used to pin the ink and allows for higher machine output of up to 250 ft/min. Station 2 is a final UV cure to fully cure the ink. After UV curing of the printed ink, the printed duct tape with barrier layer proceeds to tape rewind at point 88. This barrier layer protects the adhesive from adhering to the ink on the tape when rewound.

The method(s) of the present invention is capable of producing finished roll products having features including, but not limited to, custom designs, custom colors, and photography with high resolution. The method(s) of the present invention is also conducive to producing surface printed sheets having features including, but not limited to, custom designs, custom colors, and photography with high resolution. The method(s) of the present invention is also suitable for making die-cut items such as letters, numbers, shapes, and stickers.

The method(s) of the present invention with its digital printing capability provides for duct tape patterns that are not governed by print cylinder repeat. As a result, among the advantages of the method(s) of the present invention are the ability and flexibility to produce low cost proofs and to produce quick-turnaround mockups for customers.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of making a printed duct tape, the method comprising:
   providing a duct tape having an adhesive surface and a non-adhesive surface,
   treating the non-adhesive surface of the duct tape in preparation for printing,
   digitally printing a design with ink on the treated surface of the duct tape,
   drying the ink on the digitally printed duct tape with ultraviolet light curing, and applying an overcoat material or composition having a release property to the digitally printed surface of the duct tape.

2. The method according to claim 1, further comprising drying of the overcoat material or composition by UV light.

3. The method according to claim 1, wherein the overcoat material or composition is flexographically applied.

4. The method according to claim 1, further comprising laminating or applying a release liner to the duct tape.

5. The method according to claim 1, further comprising winding the printed duct tape onto a roll.

6. The method according to claim 1, further comprising forming the duct tape into a sheet.

7. The method according to claim 1, further comprising die-cutting the printed duct tape.

8. The method according to claim 1, wherein ultraviolet light curing occurs in a first stage and a second stage.

9. The method according to claim 8, wherein the first stage of curing is for pinning the ink.

10. The method according to claim 9, wherein the second stage of curing is a final UV cure of the ink.

11. The method according to claim 1, wherein digital printing is by inkjet printing.

12. A printed duct tape made according to the method of claim 1.

13. A method of making a printed duct tape, the method comprising:
providing a polymeric film having a surface,
digitally printing a design with an ink on the surface of the film,
curing the ink on the printed film with ultraviolet light,
applying an overcoat material or composition having a release property to the digitally printed surface of the duct tape,
providing a duct tape or subtape component, and
laminating the printed film to the duct tape or subtape component.

14. The method according to claim 13, further comprising treating the surface of the film in preparation for printing.

15. The method according to claim 13, wherein ultraviolet light curing occurs in a first stage and a second stage.

16. The method according to claim 15, wherein the first stage of curing is for pinning the ink.

17. The method according to claim 15, wherein the second stage of curing is a final UV cure of the ink.

18. The method according to claim 11, wherein digital printing is by inkjet printing.

19. A printed duct tape made according to the method of claim 13.

20. A method of making a printed duct tape, the method comprising:
providing a duct tape having an adhesive surface and a non-adhesive surface,
treating the non-adhesive surface of the duct tape in preparation for printing,
digitally printing a design with ink on the treated surface of the duct tape,
drying the ink on the digitally printed duct tape with ultraviolet light curing, and
applying a release liner to the duct tape.

21. The method according to claim 13, further comprising applying a release liner to the duct tape.

22. A printed duct tape made according to the method of claim 20.

* * * * *